United States Patent [19]

Schmidt et al.

[11] Patent Number: 4,500,063
[45] Date of Patent: Feb. 19, 1985

[54] FENDER MOUNT FOR A MIRROR

[76] Inventors: William P. Schmidt, 21000 Woodruff, Rockwood, Mich. 48173; Franklin D. Hutchinson, 28000 Bell Rd., New Boston, Mich. 48164

[21] Appl. No.: 245,886
[22] Filed: Mar. 20, 1981
[51] Int. Cl.³ .............................................. B60R 1/02
[52] U.S. Cl. ................................. 248/475.1; 248/314
[58] Field of Search ................. 248/67.5, 103, 104, 248/105, 226.3, 314, 316 D, 475 R, 475 A, 476, 479, 480, 514

[56] References Cited

U.S. PATENT DOCUMENTS

| 864,947 | 9/1907 | Buffinton | 248/67.5 |
|---|---|---|---|
| 1,905,623 | 4/1933 | Deitz | 248/475 R |
| 1,932,483 | 10/1933 | Ritz Woller | 248/480 |
| 1,964,873 | 7/1934 | Dujardin | 350/307 X |
| 2,421,140 | 5/1947 | Blaner | 248/314 X |
| 2,733,883 | 2/1956 | Gourley | 248/105 |
| 2,956,103 | 10/1960 | Steel | 248/74 R X |
| 3,162,407 | 12/1964 | Yax | 248/514 |
| 3,395,883 | 8/1968 | Murgas | 248/480 |
| 3,495,799 | 2/1970 | Murgas | 248/475 R |
| 3,856,244 | 12/1974 | Menschen | 248/67.5 |
| 4,131,257 | 12/1978 | Sterling | 248/67.5 |

FOREIGN PATENT DOCUMENTS 758198 10/1956 United Kingdom ............... 248/536

Primary Examiner—William H. Schultz
Attorney, Agent, or Firm—Norbert M. Lisicki

[57] ABSTRACT

A mount for securing a mirror to the curved portion of a vehicle fender is disclosed. The mount includes a base member having a mounting surface and an opposite outer surface. The mounting surface of the base member is secured to the curved front portion of the fender. A cover member is secured to the outer surface of the base member. The cover member and the base member define a cavity therebetween for securing the lower end of the mirror mount between.

9 Claims, 5 Drawing Figures

U.S. Patent  Feb. 19, 1985  4,500,063
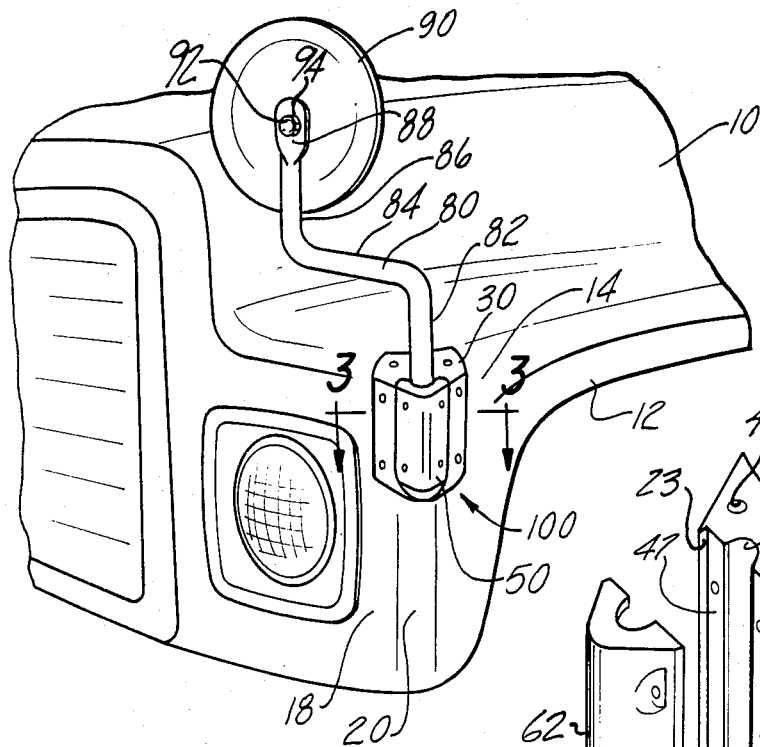
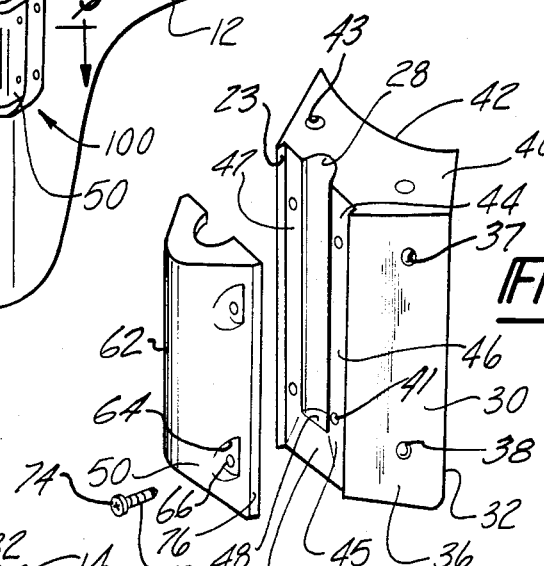
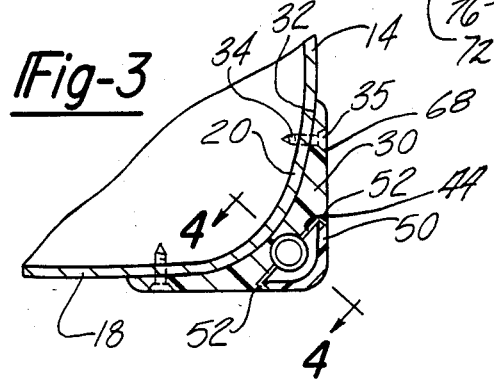
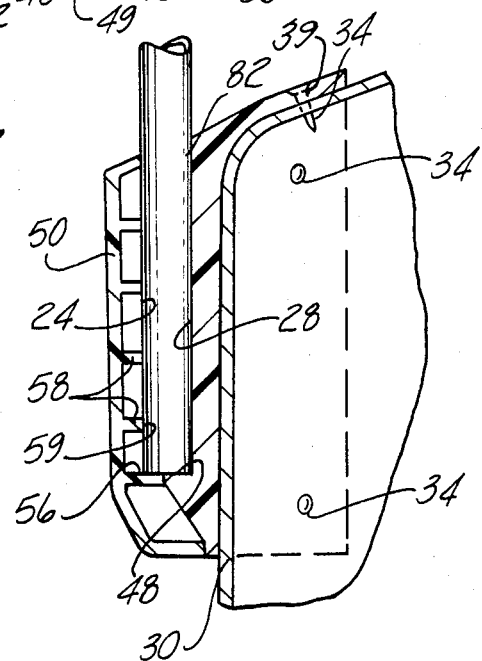
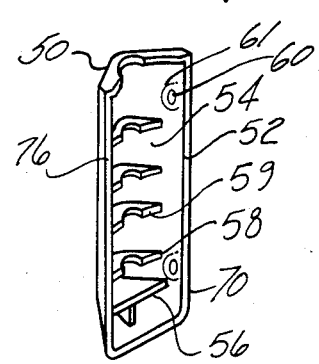

FENDER MOUNT FOR A MIRROR

FIELD OF THE INVENTION

The present invention relates generally to rear view mirrors and more particularly to a fender mount for automotive vehicles.

BACKGROUND OF THE INVENTION

Motor vehicles require mirrors in order to provide the driver or operator of the vehicle, with the widest possible field of view around his vehicle. This is done for safety purposes since most vehicles, due to their structural design, have "blind spots" which prevent the driver from seeing any object which may come near the vehicle. For years, automotive designers have attempted to eliminate these "blind spots" when designing their vehicles, however, this objective can never be reached because of the basic design of the motor vehicle. Thus, it has been found necessary to mount mirrors in and around the vehicle to enhance the field of view of the driver.

Moseby in U.S. Pat. No. 2,969,715 discloses mounting a very large rear view mirror to one side of the vehicle.

Because of an increased concern for safety considerations, more recent design rear view mirrors are being given streamline configurations. Quite frequently, these designs are rather long and elongated in the direction of the longitudinal axis of the vehicle. The mirror may be mounted on one of the front fenders or on one of the front doors of the vehicle. While the streamline configuration of such mirrors has already significantly contributed to making collisions with these mirrors less dangerous, it is clear that safety problems still exist in this respect. This is so because these mirrors generally extend laterally of the vehicle body, that is laterally of the maximum width vehicle chassis.

In response to this, Talbet in U.S. Pat. No. 3,592,532 provides a rear view mirror which is retractable. Thus, the mirror normally extends laterally beyond the confines of the vehicle coach work but becomes retracted to within the confines of the vehicle coach work in response to an abutment against a person or an object.

Another attempt to solve this problem is discussed in U.S. Pat. No. 4,165,156 to O'Connell, issued Aug. 21, 1979, wherein an outside mounted vehicle mirror assembly is disclosed. The mirror assembly includes a unitary mirror head supporting bracket which is rotatable between a storage position generally parallel to the vehicle side wall and another position generally normal to the vehicle side wall. Further, the mirror is supported upon a unitary bracket for movement between inboard and outboard rearward viewing positions. This mirror, however, is adapted to be pivotally mounted to an outside vehicle panel such as a door and thus its field of vision is limited.

None of the aforementioned prior art mirrors have been successfully employed in school busses to reduce "blind spots" of motor vehicles. Thus, the National Safety Council has reported 58,000 annual school bus accidents occurring nationally in 1977 and 1978 which resulted in approximately 165 fatalities per year. A Kansas Department of Transportation study of these national school bus fatalities pinpoints the contributing factors. From 1975 through 1978, 73 percent of the fatalities were among homeward bound pupils; 60 percent of the pupils were killed by the bus itself; and 47 percent were 5 and 6 years old. These statistics indicate that enhancing the driver's view in front of and around the motor vehicle could significantly reduce these fatalities.

SUMMARY OF THE INVENTION

The present invention is directed to a front-wheel fender mount for securing a mirror mount thereto which permits the mounting of the rear view mirror thereto which extends laterally inwardly of the vehicle, adjacent to the front end of the vehicle so as to permit widest possible view to the operator in front of and around the vehicle.

The mount for securing a mirror mount to the curved portion of the vehicle fender according to the present invention includes a base member having an inner surface secured to the curved front portion of the fender and an opposite outer surface. In addition, a curved cover member is secured to the outer surface of the base member. The cover member and the base member further having portions defining a cavity therebetween for securing the lower end of the mirror mount therein.

The present invention also includes a mirror mount for securing a mirror to the front curved portion of the vehicle fender. The mirror mount includes a base member having an inner surface secured to the front curved portion of the vehicle fender and an opposite surface. A cover member is secured to the outer surface of the base member. The cover member and the base member further have portions therebetween defining a longitudinal cavity. Additionally, a mirror mount having a lower end, an upper end and a transverse portion therebetween is also provided. The lower end of the mirror mount is secured within the cavity with the upper end having a mirror secured thereto.

Therefore, it is an object of the present invention to provide a mount for positioning a mirror adjacent to the front curved portion of the vehicle fender, which extends inwardly within the confines of the vehicle chassis and which is inexpensive and easy to fabricate.

Still another object of the present invention is to provide a front fender mirror mount which permits the mirror to extend laterally inwardly of the vehicle chassis, which is easily adapted to many motor vehicle configurations and is simple to install thereon.

A still further object of the present invention is to provide a front fender mirror mount which is streamlined in configuration, easy to install on many vehicle configurations, and which permits the quick and easy replacement of the mirror on the mirror mount.

These and other objects and advantages of the present invention will be come apparent upon reading the following detailed description upon reference to the drawings.

BRIEF DESCRIPTION OF THE DRAWINGS

FIG. 1 is a perspective view of the mount according to my invention on the front fender of a motor vehicle.

FIG. 2 is an exploded perspective view of the mount according to the present invention.

FIG. 3 is a sectional view taken along section 3—3 of FIG. 1.

FIG. 4 is a sectional view along 4—4 of FIG. 3.

FIG. 5 is a perspective view showing the inner surface of the cover member according to the present invention.

DETAILED DESCRIPTION OF THE PREFERRED EMBODIMENTS

In the accompanying drawings, the mirror mount, which is constructed in such a way as to demonstrate the principles of the present invention, is generally designated by the numeral 100.

As shown in FIG. 1, the mount 100 includes a base member 30 and a cover member 50. The mount 100 is suitably fastened to the front curved portion 14 of a fender 12 of a vehicle 10. The mount 100 also extends around the contoured edge 20 so as to extend against the front end 18 of the vehicle 10. Those skilled in the art will recognize that the vehicle 10 may be a school bus, truck, van, automobile, or any other suitable coach work or chassis of a vehicle. The cover member 50 is suitably secured to the base member 30, as will be described herein later, so as to secure the lower portion 82 of a suitable mirror mount 80 therein. The lower portion 82 is connected to a transverse portion 84 which is then suitably secured to an upper portion 86 so as to form a generally s-shaped member when the transverse portion 84 is rotated 90 degrees from its position shown in FIG. 1. The lower portion 82 is parallel to the upper portion 86. The upper portion 86 has an aperture 88 formed at its one end to permit the insertion of a threaded bolt 92 of a mirror 90. The mirror 90 is then suitably secured to the upper portion of the mirror mount 80 by means of a nut 94 which engages the threaded portion 92 so as to sandwich the mirror mount between the nut and the mirror 90 as is well known in the prior art.

The base member 30, as best shown in FIGS. 2 and 3, includes an inner or mounting surface 32 and an outer surface 36 which includes a top portion 40. The outer surface 36 has a plurality of apertures 38 formed therein with counterbores 37 around the apertures 38. The counterbores 37 have a radial shoulder portion 39. The threaded fastener member 34 is inserted through each of the apertures 38 so as to engage the vehicle 10. The head 35 of the fastener member 34 engages the radial shoulder portion 39 to hold the base member 30 to the vehicle 10. The threaded fastener members 34 are preferably a self-tapping screw threaded members which frictionally engage the front curved portion 14 and/or the front end 18 of the vehicle 10. In the alternative, the base member 30 may be adhesively bonded to the vehicle 10 if desired. Since the front curved portion 14 of the vehicle 10 is usually substantially perpendicular to the front end 18, the top portion 40 extends between the front end 18 and the front curved portion 14 and has an arcuate edge 42 to blend into the contours of the vehicle 10. The top portion 40 also has a plurality of apertures 43 formed therein to permit insertion of suitable threaded fastener members such as self-tapping screws therethrough to engage the vehicle 10 by means of suitable threaded fasteners 34 as is well known in the prior art.

The outer surface 36 further has a recess 44 which defines a flat mounting surface 46. The mounting surface 46 has a first mounting surface 47 adjacent but spaced away from a second mounting surface 45. The lower ends of the first and second mounting surfaces 45, 47, respectively, have a transverse connecting mounting surface 49 therebetween. In between the first and second mounting surfaces 45, 47, respectively, is formed a longitudinal partial bore 28 for a purpose to be described later on herein. The longitudinal partial bore 28 is parallel to the first and second mounting surfaces 45, 47, respectively, and forms a stop 48 adjacent to the connecting mounting surface 49.

The cover member 50 has an inner or bearing surface 52 and an outer surface 62. The inner or bearing surface 52 is contoured to fit within the recess 44 of the base member 30.

As best shown in FIG. 5, the cover member 50 has a plurality of transverse rib members 58 which extend perpendicular to the longitudinal axis of the cover member 50. The rib members 58 ae formed with bearing surfaces 59 for a purpose to be described later on herein. The rib members 58 are formed in the cavity 54 which extends within the periphery of the bearing surfaces 59 and further defined by the side walls of the cover member 50. One of the rib members 58 defines a stop 56 for a purpose to be described later on herein. The other rib members 58 define a longitudinal partial bore 24 for a purpose to be described later on herein. In addition, the rib members 58 define a bearing surface 59 to co-act with the first and second mounting surfaces 45, 47 when the cover member 50 is secured to the base member 30.

Returning back to FIGS. 2 and 3, the outer surface 62 of the cover member 50 further has a plurality of apertures 64 formed therethrough. Each of the apertures 64 has a counter bore 66 which defines a radial shoulder portion 68. The apertures 64 extend through the cover member 50 and each of the apertures 64 has a boss 60 formed on the opposite wall as is best seen in FIG. 5. Each of the bosses 60 further has a radial shoulder portion 61. Finally, the cover member 50 has a peripheral edge 76 which is complimentary to the recess 44 in the base member 30.

As shown in FIG. 3, the cover member 50 fits within the recess 44 of the base member 30 and is secured thereto by means of threaded fasteners 74 which are inserted into each of the apertures 64. Thus, the threaded portion 72 of the fasteners 74 engages the apertures 41 formed in the first and second surfaces 45, 47, respectively, as best seen in FIGS. 2 and 3. In addition, the first and second mounting surfaces 45, 47, respectively, further have complimentary recesses formed in their surfaces which terminate in complimentary radial shoulder portions 23 to permit the radial shoulder portions 61 of the bosses 60 to fit therein. Thus, when the cover member 50 is secured to the base member 30, the edge 70 of the cover member 50 bears against the recess 44 of the base member 30 and the bosses 60 of the cover member 50 fit within the recesses 23 in the mounting surfaces 46 and 47 respectively. In this position, the longitudinal partial bore in the cover member is aligned with the longitudinal partial bore 28 in the base member to form a cavity 26 therein. Into the cavity 26 is inserted the lower portion 82 of the mirror mount 80 as was discussed previously as shown in FIGS. 4 and 1. The stop 56 in the cover member 50 and the stop 48 in the base member 30 permits a predetermined length of the lower portion 82 to be inserted between the cover member 50 and the base member 30 so that when the threaded fasteners 74 are tightened to join the cover member 50 to the base member 30, the bearing surfaces 59 of the rib members 58 frictionally engage the lower portion 82 to the mirror mount 80. Thus, the mirror mount is secured to the vehicle 10.

Those skilled in the art will recognize that the threaded fasteners 74 are preferably self-tapping screws so as to engage the apertures 41 in the mounting surfaces 46. In the alternative, the threaded fasteners 74 may be screws and bolts well known in the prior art.

To mount the base member 30 to the vehicle 10, the mounting surface 32 is placed against the front curved portion 14 and the front end 18 and the contoured edge 20 of the vehicle 10 and threaded fasteners 34 are inserted into the apertures 38 to engage apertures in the front curved portion 14 and the front end 18. As the threaded fasteners 34 engage the apertures in the vehicle 10, the heads 35 engage the radial shoulders 39 so that the mounting surface 32 is contiguous with the contoured surface of the vehicle 10. Next, the edge 76 of the cover member 50 inserted into the recess 44 of the base member 30 and threaded fasteners 74 are inserted into the apertures 64 so that the threaded portions 72 engage the apertures 41 formed in the mounting surfaces 45, 47. The lower portion 82 of the mirror mount 80 is inserted into the longitudinal partial bores 28 in the base member 30 and the bore 24 in the cover member 50. Then, the threaded fasteners 74 are rotated such that the heads 75 engage the radial shoulder 68 which cause the bearing surfaces 59 to frictionally engage against the lower portion 82. Thus, the mirror mount 80 is secured to the vehicle 10.

While the invention has been described in connection with the preferred embodiment, it is understood that it is not intended to limit the invention to that embodiment. On the contrary, it is intended to cover all alternatives, modifications and equivalents which may be included within the scope of the invention as defined by the appended claims.

What is claimed is:

1. A mount adapted for securing a mirror support member to the curved portion of a vehicle fender, said mount comprising:
    a base member having a mounting surface adapted to be secured to the curved portion of the vehicle fender and an opposite outer surface;
    a cover member secured to said outer surface of said base member; and
    aperture means, interposed between said base member and said cover member, for holding a predetermined length of the the mirror support member therebetween so that the mirror support member is rigidly secured to the vehicle fender, said aperture means further having at least two rib members extending between said base member and said cover member, one of said at least two rib members forming a stop and the other of said at least two rib members having portions defining a bore for frictionally engaging the mirror support member.

2. A mount as claimed in claim 1 wherein said cover member further having a plurality of ribs extending perpendicular to the longitudinal axis of said aperture means to retain the mirror mount support member in a fixed position.

3. A mount as claimed in claim 1 wherein said cover member further has an inner surface and a plurality of ribs extending horizontally across said inner surface of said cover member to retain the mirror support member in a fixed position.

4. A mount as claimed in claim 1 wherein said aperture means extends vertically between said base member and said cover member.

5. A mount as claimed in claim 4 wherein said cover member further has an inner surface and a plurality of ribs extending horizontally across said inner surface to retain the mirro support member in a fixed position.

6. A mount as claimed in claim 5 wherein said base member further has a portion defining a recess adjacent said cavity for piloting said cover member thereto.

7. A mount as claimed in claim 6 wherein said recess further defines a mounting surface for said cover member.

8. A mirror mount adapted for securing a mirror to the curved portion of a vehicle fender, said mirror mount having a lower end and an opposite upper end with the mirror secured thereto, said mirror mount comprising:
    a base member having an inner surface adapted to be secured to the curved portion of the vehicle fender and an opposite surface; and
    a cover member secured to said outer surface of said base member, said cover member and said base member having portions therebetween defining a separable cavity, said cover member further having at least two rib members extending transversely of said cavity, one of said at least two rib members forming a stop to locate the lower end of the mirror mount in said cavity, another of said at least two rib members having portions defining a bore for frictionally engaging the lower end of the mirror mount.

9. A mount adapted for securing a mirror mount to the curved portion of a vehicle fender, said mount comprising:
    a base member having a mounting surface adapted to be secured to the vehicle fender and an opposite outer surface; and
    a cover member secured to said outer surface of said base member, said cover member and said base member defining a separable cavity therebetween, said cavity in said cover member having a plurality of rib members extending transversely of said cavity, one of said plurality of rib members forming a stop, the other of said plurality of rib members having portions defining a bore for frictionally engaging the lower portion of said mirror mount.

* * * * *